United States Patent [19]
Lee

[11] Patent Number: 6,145,822
[45] Date of Patent: Nov. 14, 2000

[54] POWER PLANT SUPPORTING MOUNT

[75] Inventor: Hyo-sang Lee, Kyungki-do, Rep. of Korea

[73] Assignee: Hyundai Motor Company, Seoul, Rep. of Korea

[21] Appl. No.: 09/116,197

[22] Filed: Jul. 16, 1998

[51] Int. Cl.[7] .................................. F16F 5/00; F16F 9/00
[52] U.S. Cl. ...................... 267/140.13; 267/293; 267/219
[58] Field of Search ...................................... 267/219, 292, 267/293, 294, 141.3, 141.4, 141.5, 140.11, 140.12, 140.13, 257

[56] References Cited

U.S. PATENT DOCUMENTS

| | | | |
|---|---|---|---|
| 5,127,636 | 7/1992 | Spaltofski | 267/140.11 |
| 5,503,376 | 4/1996 | Simuttis et al. | 267/293 |
| 5,947,454 | 7/1999 | Miyamoto | 267/140.12 |

*Primary Examiner*—Robert J. Oberleitner
*Assistant Examiner*—Robert A. Siconolfi

[57] ABSTRACT

Disposed is a supporting mount for a power plant such as an engine or a transmission. The power plant includes an inner pipe and an outer pipe, a vibration absorbing member interposed between the inner pipe and the outer pipe, a rolling restriction member connected to the inner pipe and which restricts the power plant from vibrating more than a predetermined amount with relation to a vehicle frame, first and second fluid chambers formed in the vibration absorbing member and which are filled with operating fluid, first and second fluid communicating passages communicating the first and second fluid chambers, a displacement reaction portion provided in the outer pipe and which reacts to substantial movement by the outer pipe by contact with the rolling restriction member, and a fluid passage adjusting portion which decreases a size of the second fluid communicating passage in direct proportion to the amount of rolling of the engine or transmission to which the displacement reaction portion responds.

4 Claims, 1 Drawing Sheet

6,145,822

POWER PLANT SUPPORTING MOUNT

BACKGROUND OF THE INVENTION (a) Field of the Invention

The present invention relates to a power plant supporting mount which insulates a power plant such as an engine or a transmission from the vehicle frame so that vibrations are not conveyed therebetween. More particularly, the present invention relates to a power plant supporting mount which effectively restricts rolling of an engine or transmission in which the same vibrate in a predetermined direction in relation to the frame.

(b) Description of the Prior Art

Referring to FIG. 1, shown is a sectional view of a conventional power plant supporting mount.

As shown in the drawing, the conventional power plant supporting mount comprises an inner pipe 52 connected to the frame, and an outer pipe 53 connected to the power plant, i.e., the engine or transmission. A vibration absorbing member 54 made of an elastic material is provided between the inner pipe 52 and the outer pipe 53. Further, a plate-shaped rolling restriction member 55 is integrally formed on an outside circumference of the inner pipe 52 such that the rolling restriction member 55 is also connected to the frame, and surrounds opposing ends of the outer pipe 53 and the vibration absorbing member 54. The rolling restriction member 55 restricts the vibration of an engine or transmission bracket (not shown) when the same exceeds a predetermined degree of movement.

In the prior art power plant supporting mount structured as in the above, when rolling occurs between the frame and the engine or transmission such that the outer pipe 53 moves in relation to the inner pipe 52, the elastic vibration absorbing member 54 interposed between the inner pipe 52 and the outer pipe 53 absorbs the vibrations generated by the rolling operation. Accordingly, rolling is quickly offset and suppressed.

Here, if the movement of the outer pipe 53 in relation to the inner pipe 52 is substantial (namely, if there is a large amount of rolling), the outer pipe 53 and the engine or transmission bracket connected to the outer pipe 53 comes into contact with the rolling restriction member 55. As a result, large vibrations of the outer pipe 53 and the engine or transmission bracket are prevented. Moreover, because the collision of the outer pipe 53 and the engine or transmission bracket with the rolling restriction member 55 causes the generation of shock, a rubber stopper 56 is disposed on the inner pipe 52 between the rolling restriction member 55 and the outer pipe 53.

However, the rubber stopper 56 does not sufficiently absorb the shock generated by the collision of the outer pipe 53 and the engine or transmission bracket with the rolling restriction member 55.

SUMMARY OF THE INVENTION

The present invention has been made in an effort to solve the above problem.

It is an object of the present invention to provide a power plant supporting mount which sufficiently absorbs and offsets rolling of a power plant such as an engine or transmission without the use of a colliding action as in the prior art such that shock-absorbing performance is greatly enhanced.

To achieve the above object, the present invention provides a power plant supporting mount. The power plant supporting mount includes an inner pipe and an outer pipe, a vibration absorbing member interposed between the inner pipe and the outer pipe, a rolling restriction member connected to the inner pipe and which restricts the power plant from vibrating more than a predetermined amount with relation to a vehicle frame, first and second fluid chambers formed in the vibration absorbing member and which are filled with operating fluid, first and second fluid communicating passages communicating the first and second fluid chambers, a displacement reaction portion provided in the outer pipe and which reacts to substantial movement by the outer pipe by contact with the rolling restriction member, and a fluid passage adjusting portion which decreases a size of the second fluid communicating passage in direct proportion to the amount of rolling of the engine or transmission to which the displacement reaction portion responds.

According to a feature of the present invention, the displacement reaction portion comprises a slide rod mounted in the outer pipe and able to undergo rectilinear movement therein; first and second stoppers mounted on opposing extremes of the slide rod extending in a direction toward the rolling restriction member; and elastic members elastically supporting slide rod to maintain the same in a central position with respect to the outer pipe.

According to another feature of the present invention, the fluid passage adjusting portion comprises a spool displaced in relation to the second fluid communicating passage according to the amount of movement of the displacement reaction portion to change the size of the second fluid communicating passage.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

A preferred embodiment of the present invention will now be described in detail with reference to the accompanying drawing.

Figure 1:
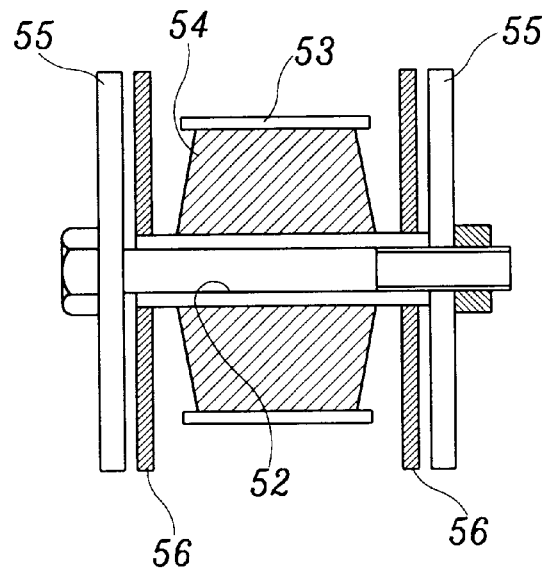
FIG. 1 is a section view of the conventional power plant supporting mount.
Figure 2:
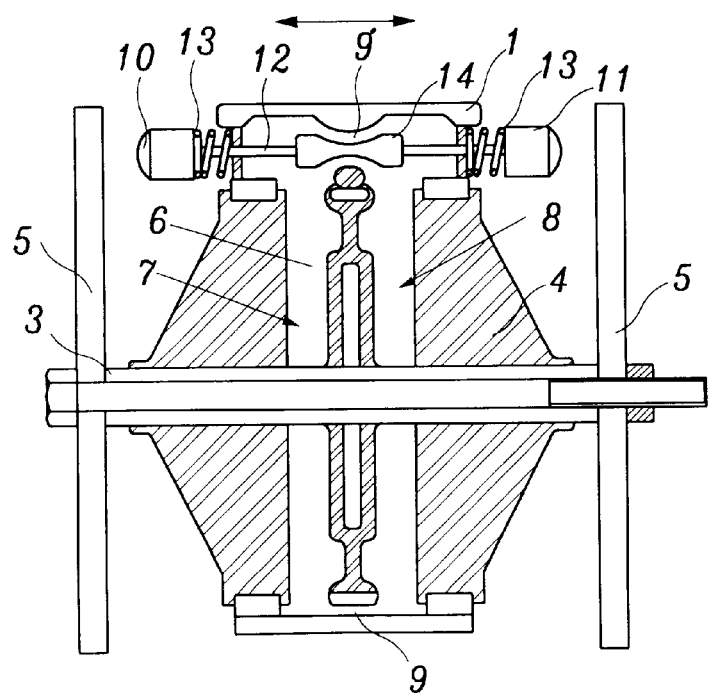
FIG. 2 is a sectional view of a power plant supporting mount according to a preferred embodiment of the present invention.

Referring to FIG. 2, shown is a sectional view of a power plant supporting mount according to a preferred embodiment of the present invention.

As shown in the drawing, the inventive power plant supporting mount comprises an outer pipe 1 connected to a power plant such as an engine or a transmission (not shown), and an inner pipe 3 connected to the vehicle frame (not shown). A vibration absorbing member 4 is disposed between the outer pipe 1 and the inner pipe 3. In addition, first and second fluid chambers 7 and 8 are formed in an interior of the vibration absorbing member 4, the fluid chambers 7 and 8 being filled with operating fluid 6. The fluid chambers 7 and 8, which are separately formed in the vibration absorbing member 4, communicate via first and second fluid communicating passages 9 and 9'. Further, a rolling restriction member 5 is provided on the inner pipe 3 as in the prior art.

As a feature of the present invention, there are provided a displacement reaction portion which reacts to substantial movement by the outer pipe 1 caused by extensive rolling of the engine or transmission, and a fluid passage adjusting portion which decreases a size of the second fluid communicating passage 9' in direct proportion to the amount of rolling of the engine or transmission to which the displacement reaction portion responds.

The displacement reaction portion comprises a slide rod 12 mounted in the outer pipe 1 and able to undergo rectilinear movement therein; first and second stoppers 10 and 11 mounted on opposing extremes of the slide rod 12 outside the outer pipe 1, the first and second stoppers 10 and 11 extending in a direction toward the rolling restriction member 5; and elastic members 13 such as coil springs mounted on the slide rod 12 and interposed between the outer pipe 1 and the first and second stoppers 10 and 11, the elastic members 13 maintaining the slide rod 12 in a central position with respect to the outer pipe 1.

Further, the fluid passage adjusting portion comprises a spool 14. The spool 14 is displaced in relation to the second fluid communicating passage 9' according to the amount of movement of the displacement reaction portion, thereby changing the size of the second fluid communicating passage 9'. The spool 14 is integrally formed to the slide rod 12 of the displacement reaction portion and its central portion is depressed. An inner wall of the outer pipe 1 corresponding to a position of the second fluid communicating passage 9' protrudes toward the depressed portion of the spool 14.

The operation of the power plant supporting mount according to a preferred embodiment of the present invention as structured as in the above will be described hereinafter.

The inventive power plant supporting mount operates in two ways depending on the amount of rolling of the engine or transmission. Namely, rolling is restricted in one manner when there is only a minimal amount of rolling, and in another manner when rolling is more substantial such that the first and second stoppers 10 and 11 of the slide rod 12 contact the rolling restriction member 5.

First, when the first and second ends 10 and 11 of the slide rod 12 are not contacting the rolling restriction member 5, indicative of a minimal amount of rolling by the engine or transmission, rolling of the engine or transmission is absorbed by the vibration absorbing member 4, and, at the same time, offset by the flow of the operating fluid 6 between the first and second fluid chambers 7 and 8.

That is, when the outer pipe 1 moves leftward (in the drawing), the capacity (to hold the operating fluid 6) of the second fluid chamber 8 decreases by the change in shape of the vibration absorbing member 4, while the capacity of the first fluid chamber 7 increases. Accordingly, some of the operating fluid 6 in the second fluid chamber 8 exits to enter the first fluid chamber 7 via the first and second fluid communicating passages 9 and 9'. This action is repeated in an opposite manner (i.e., the operating fluid 6 in the first fluid chamber 7 exiting to enter the second fluid chamber 8) when the outer pipe 1 moves rightward, and the continuous operation in this manner functions to offset, and quickly eliminate, the vibration generated between the outer pipe 1 and the inner pipe 3.

The operation of limiting a more substantial amount of rolling of the engine or transmission will now be described. If either the first or second stoppers 10 and 11 of the slide rod 12 contacts the rolling restriction member 5, the slide rod 12 moves to be displaced within the outer pipe 1. As the spool 14 is integrally formed to the slide rod 12, the spool 14 also moves to as much of a degree as the slide rod 12 such that there is a reduction in size of the second fluid communicating passage 9', the second fluid communicating passage 9' being defined by the depression of the spool 14 and the inner wall of the outer pipe 1.

As a result, the flow of the operating fluid 6 between the first and second fluid chambers 7 and 8 is restricted to limit the amount of movement of the vibration absorbing member 4 and the outer pipe 1. Accordingly, the amount of offsetting force provided to the outer pipe 1 is increased. This increase in the amount of offsetting force enables a larger amount of rolling of the engine or transmission transmitted to the outer pipe 1 to be smoothly absorbed.

In the above, as the opening size of the second fluid communicating passage 9' is reduced in proportion to the amount of movement of the slide rod 12 (i.e., the amount of rolling), the degree of offsetting force is increased in relation to increases in rolling of the engine or transmission.

In the power plant supporting mount structured and operating as in the above, as rolling is restricted by being absorbed by the vibration absorbing member or by offsetting force, the offsetting force being increased in proportion to increases in rolling, smooth, efficient and speedy insulation of vibration between the engine or transmission and the frame is realized.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A power plant supporting mount comprising:
    an inner pipe and an outer pipe;
    a vibration absorbing member interposed between the inner pipe and the outer pipe;
    a rolling restriction member connected to the inner pipe which restricts the power plant from vibrating more than a predetermined amount with relation to a vehicle frame;
    first and second fluid chambers formed in the vibration absorbing member which are filled with operating fluid;
    first and second fluid communicating passages connecting the first and second fluid chambers;
    a displacement reaction portion provided in the outer pipe which reacts to substantial movement by the outer pipe by contact with the rolling restriction member, the displacement reaction portion including a slide rod mounted in the outer pipe and able to undergo rectilinear movement therein, first and second stoppers mounted on opposing extremes of the slide rod extending in a direction toward the rolling restriction member, and elastic members elastically supporting slide rod to maintain the same in a central position with respect to the outer pipe; and
    a fluid passage adjusting portion which decreases a size of the second fluid communicating passage in direct proportion to the amount of rolling of the engine or transmission to which the displacement reaction portion responds.

2. The power plant supporting mount of claim 1 wherein the fluid passage adjusting portion comprises a spool displaced in relation to the second fluid communicating passage according to the amount of movement of the displacement reaction portion to change the size of the second fluid communicating passage.

3. The power plant supporting mount of claim 1 wherein the displacement reaction portion comprises a spool integrally formed to the slide rod and which is displaced in relation to the second fluid communicating passage according to the amount of movement of the displacement reaction portion to change the size of the second fluid communicating passage.

4. A power plant supporting mount comprising:

an inner pipe and an outer pipe;

a vibration absorbing member interposed between the inner pipe and the outer pipe;

a rolling restriction member connected to the inner pipe which restricts the power plant from vibrating more than a predetermined amount with relation to a vehicle frame;

first and second fluid chambers formed in the vibration absorbing member which are filled with operating fluid;

first and second fluid communicating passages connecting the first and second fluid chambers;

a displacement reaction portion provided in the outer pipe which reacts to substantial movement by the outer pipe by contact with the rolling restriction member; and a fluid passage adjusting portion which decreases a size of the second fluid communicating passage in direct proportion to the amount of rolling of the engine or transmission to which the displacement reaction portion responds, the fluid passage adjusting portion including a spool displaced in relation to the second fluid communicating passage according to the amount of movement of the displacement reaction portion to change the size of the second fluid communicating passage.

* * * * *